July 12, 1932.  P. E. MATTHEWS  1,866,662
TRANSMISSION CONTROLLING MECHANISM
Filed Dec. 3, 1930   2 Sheets-Sheet 1
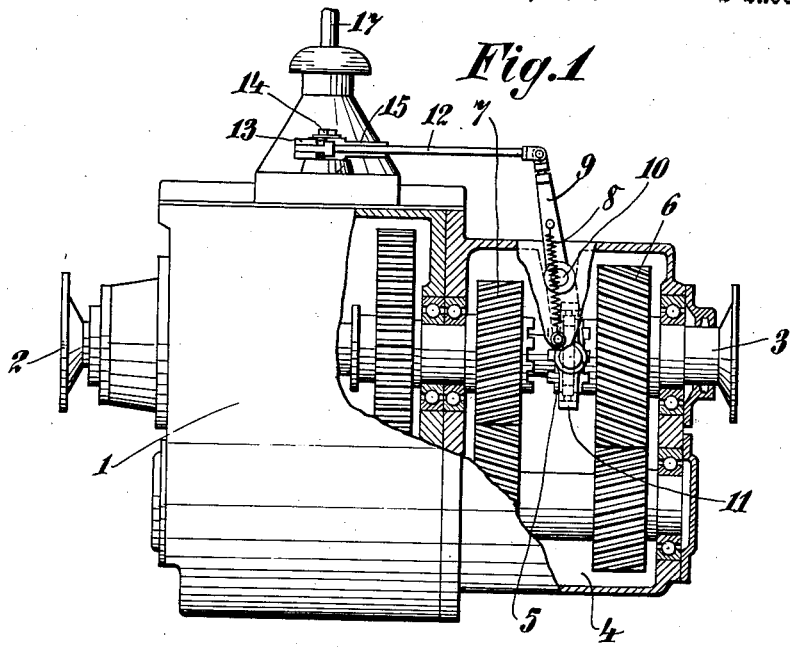
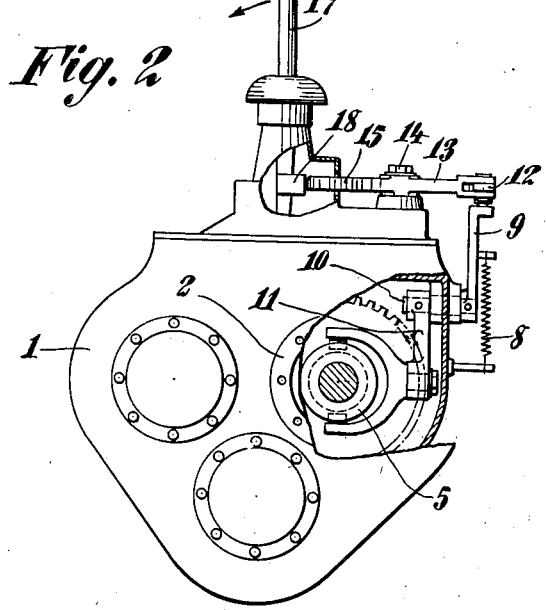
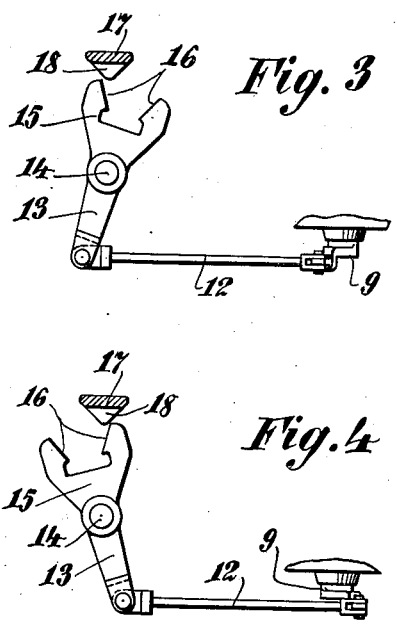
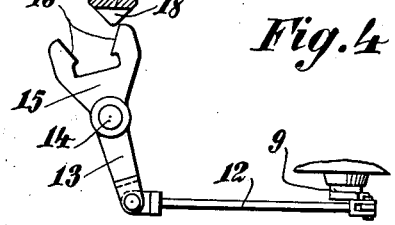
INVENTOR
Philip E. Matthews,
BY Redding, Greeley, O'Shea & Campbell
HIS ATTORNEYS July 12, 1932.  P. E. MATTHEWS  1,866,662
TRANSMISSION CONTROLLING MECHANISM
Filed Dec. 3, 1930  2 Sheets-Sheet 2
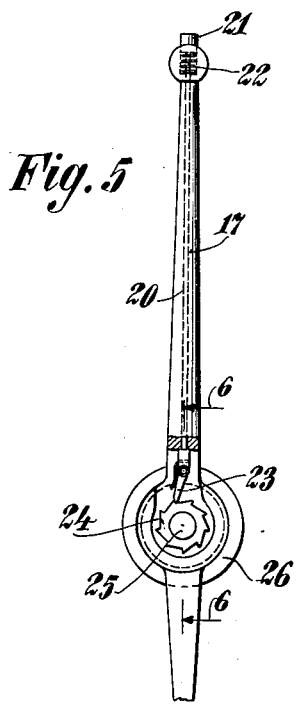
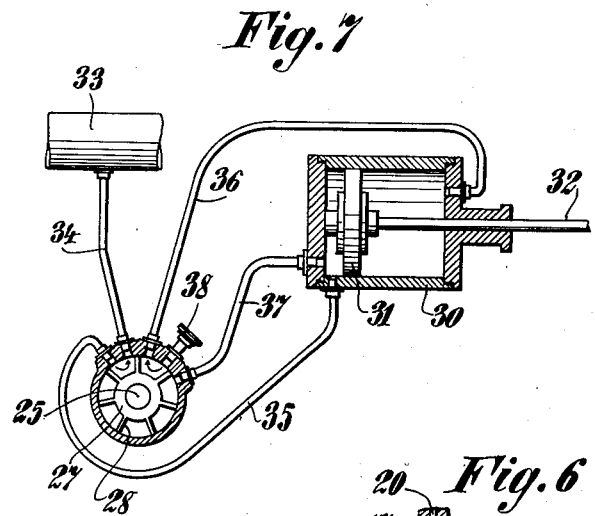
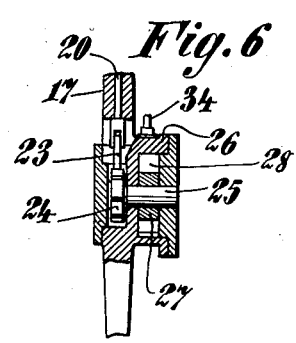
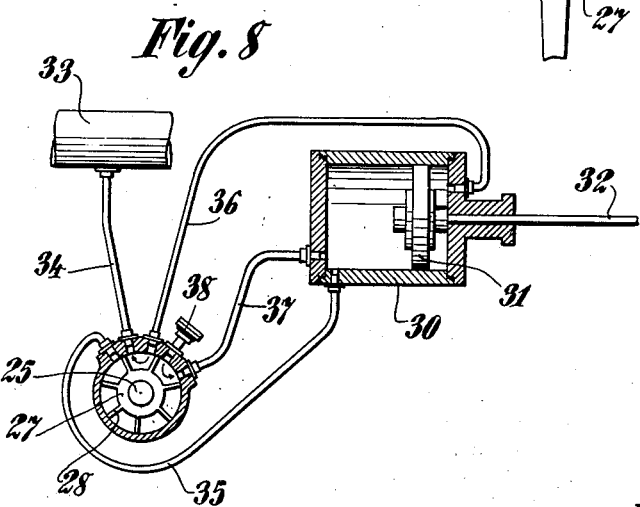
INVENTOR
Philip E. Matthews,
BY
HIS ATTORNEYS Patented July 12, 1932

1,866,662

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

TRANSMISSION CONTROLLING MECHANISM

Application filed December 3, 1930. Serial No. 499,633.

The present invention relates to multiple speed transmissions and embodies, more specifically, an improved controlling mechanism for vehicle transmissions, wherein an auxiliary transmission mechanism is utilized to multiply the speeds of a standard transmission.

More specifically, the invention embodies an improved controlling mechanism for auxiliary transmissions, such controlling mechanism being incorporated in and operable simultaneously with the controlling mechanism of the standard transmission.

An object of the invention is to provide a controlling mechanism which is simple in construction and readily operated to effect the selective control of an auxiliary transmission simultaneously with the actuation of the main transmission.

A further object of the invention is to provide a device wherein the movement of the main transmission lever of a motor vehicle or of a device carried thereby is utilized to actuate an auxiliary transmission selectively.

A further object of the invention is to provide a means for utilizing the vacuum in the intake manifold of the engine for engaging the gears of an auxiliary transmission selectively.

Further objects, not specifically enumerated above, will be apparent as the invention is described in greater detail in connection with the accompanying drawings, wherein:

Figure 1 is a view in side elevation, partly broken away and in section, showing a transmission mechanism wherein an auxiliary transmission is used in connection with a main transmission in the transmission of power.

Figure 2 is a view in end elevation, viewed from the left in Figure 1, showing the controlling mechanism for the auxiliary transmission.

Figure 3 is a detail view showing the manner in which the control for the auxiliary transmission is actuated.

Figure 4 is a view similar to Figure 3 showing controlling mechanism for the auxiliary transmission after having been moved into a different selected position.

Figure 5 is a detail view showing a transmission control lever in which is incorporated a modified form of control means.

Figure 6 is a view in section, taken on line 6—6 of Figure 5, and looking in the direction of the arrows.

Figure 7 is a diagrammatic view in section showing a device for utilizing the vacuum in the intake manifold of an engine for actuating an auxiliary transmission mechanism.

Figure 8 is a view, similar to Figure 7, showing the mechanism moved to another selected position.

Referring to the above drawings, a main transmission mechanism is shown at 1, power being supplied thereto through shaft 2. The tail shaft is shown at 3 as receiving power from an auxiliary transmission 4, having a slidable sleeve 5 for selectively engaging gears 6 and 7 with the power shaft. Each of these gears is provided with mating clutch faces with which the teeth on the sleeve 5 are adapted to engage and the sleeve is normally maintained in either engaging position by means of a loading spring 8 which is connected to a lever 9. Lever 9 is secured to a rock shaft 10 upon which shifter fork 11 is secured, this shifter fork engaging the sleeve 5 in a well known fashion. As the lever 9 moves to either side of the vertical position, the spring 8 snaps the same into a position of repose at which time the shifter fork 10 engages the sleeve 5 with the corresponding clutch teeth of the selected gear 6 or 7.

In the form shown in Figures 1, 2, 3, and 4, a link 12 connects lever 9 with a lever 13 journaled at 14 upon the top of the transmission housing. The distant end of lever 13 is formed with a yoke-shaped extremity 15 having opposed sloping cam faces 16. The manual control lever 17 is formed with a cam 18 having sloping faces which are adapted to engage the faces 16 when the manual lever is rocked laterally, as indicated by the arrow in Figure 2. As shown in Figure 3, lateral movement of the lever will cause the cam 18 to engage the left hand cam face 15 and move the link 12 toward the right, as viewed in Figure 3. If the auxiliary gear controlling mechanism is already in such position, the above movement of the gear shift lever 17 causes the cam 18 to engage the other cam face 16 as shown in Figure 4 to advance the link 12 in the opposite direction.

In the form shown in Figures 5, 6, 7, and 8, the gear shift lever 17 is provided with an auxiliary movable rod 20 having a button 21 which is normally maintained in the position shown in Figure 5 by a spring 22 within the handle of the lever 17. This rod 20 actuates a pawl 23 which engages the teeth of a ratchet wheel 24, this ratchet wheel being keyed upon a shaft 25. Shaft 25 is journaled in a valve cage 26 and carries a valve member 27 having radial vanes 28. The space between the vanes is so proportioned that, as the ratchet wheel 24 is advanced periodically by the pawl 23, certain ports described hereinafter will be opened and closed to vary the pressure within a cylinder 30 and upon opposite sides of a piston 31. Piston 31 is mounted upon a rod 32 which may replace the link 12 in the mechanism shown in Figures 1, 2, 3, and 4 and thus serves to actuate the auxiliary gear shifting mechanism.

The vacuum in an intake manifold 33 may be utilized through a conduit 34 which communicates with the valve cage 26. Peripherally spaced ports are formed in the valve cage to communicate with the conduit 34, as well as with conduits 35, 36, 37, and 38. Conduit 38 is an outlet to the atmosphere while conduit 37 connects the valve cage with the left hand end of cylinder 30. Conduit 36 connects the valve cage with the right hand end of cylinder 30 while a conduit 35 also connects the left hand of the cylinder with the valve cage. As the valve is stepped around periodically, one end of the cylinder is open to the atmosphere, while the other end is open to the vacuum in the manifold 33 and thus the piston 31 is ultimately moved into a right or left hand position, as shown in Figures 7 and 8. Actuation of the sleeve 5 is effected in an obvious fashion as will be readily understood from the foregoing description.

While the invention has been described with specific reference to the accompanying drawings, it is not to be limited, save as defined in the appended claims.

I claim as my invention:

1. In combination with a main and an auxiliary transmission, manual shifting means for the main transmission, a low pressure source, a cylinder, a piston in the cylinder, means to actuate an auxiliary transmission by the piston, a shaft journaled in the manual means, a valve disc mounted on the shaft, communicating means between the low pressure source, valve, and opposite ends of the cylinder, and means on the manual means for operating the valve operating means.

2. In combination with a main and an auxiliary transmission, manual shifting means for the main transmission, a low pressure source, a cylinder, a piston in the cylinder, means to actuate the auxiliary transmission by the piston, a shaft journaled in the manual means, a valve disc mounted on the shaft, communicating means between the low pressure source, valve, and opposite ends of the cylinder, a ratchet and pawl mechanism to actuate the shaft, and means on the manual means to actuate the last named mechanism.

3. In combination with a main and an auxiliary transmission, manual shifting means for the main transmission, a low pressure source, a cylinder, a piston in the cylinder, means to actuate the auxiliary transmission by the piston, a shaft journaled in the manual means, a valve disc mounted on the shaft, communicating means between the low pressure source, valve, and opposite ends of the cylinder, and means on the manual means to impart a step by step movement to the shaft in one direction only.

This specification signed this 25th day of Nov. A. D. 1930.

PHILIP E. MATTHEWS.